US008514789B2

(12) United States Patent
Akchurin et al.

(10) Patent No.: US 8,514,789 B2
(45) Date of Patent: Aug. 20, 2013

(54) COGNITIVE CHANNEL ADAPTATION IN WIRELESS SENSOR NETWORKS

(75) Inventors: Eldar Akchurin, Aachen (DE); Alain Gefflaut, Herzogenrath (DE)

(73) Assignee: Microsoft Corporation, Redmond, WA (US)

( * ) Notice: Subject to any disclaimer, the term of this patent is extended or adjusted under 35 U.S.C. 154(b) by 862 days.

(21) Appl. No.: 12/249,298

(22) Filed: Oct. 10, 2008

(65) Prior Publication Data

US 2010/0091715 A1 Apr. 15, 2010

(51) Int. Cl.
*H04W 4/00* (2009.01)

(52) U.S. Cl.
USPC ......... 370/329; 370/437; 455/452.2; 709/226

(58) Field of Classification Search
None
See application file for complete search history.

(56) References Cited

U.S. PATENT DOCUMENTS

| | | | |
|---|---|---|---|
| 2004/0137915 A1* | 7/2004 | Diener et al. | 455/456.1 |
| 2006/0291439 A1* | 12/2006 | Yang et al. | 370/338 |
| 2007/0129011 A1 | 6/2007 | Lal et al. | |
| 2007/0211681 A1 | 9/2007 | Sun et al. | |
| 2007/0264938 A1 | 11/2007 | Srinivasan et al. | |
| 2008/0076450 A1 | 3/2008 | Nanda et al. | |
| 2008/0112427 A1* | 5/2008 | Seidel et al. | 370/433 |
| 2008/0144628 A1* | 6/2008 | Tsai et al. | 370/392 |
| 2010/0027478 A1* | 2/2010 | Chu et al. | 370/329 |
| 2010/0046363 A1* | 2/2010 | Shenoy et al. | 370/216 |

OTHER PUBLICATIONS

Gao, et al., "Energy Efficient Adaptive Modulation in Wireless Cognitive Radio Sensor Networks", Retrieved at <<http://ieeexplore.ieee.org/ie15/4288670/4288671/04289326.pdf?temp=x&htry=1>>, ICC 2007 Proceedings. pp. 3980-3986, 2007.
Terzis, et al., "Minimising the Effect of WiFi Interference in 802.15.4 Wireless Sensor Networks", Retrieved at <<http://www.cs.jhu.edu/~razvanm/ijsnet2008interference.pdf>>, International J. Sensor Networks, vol. 3, No. 1, 2008, pp. 43-54, 2008.
Akyildiz, et al., "NeXt Generation/Dynamic Spectrum Access/Cognitive Radio Wireless Networks: A Survey", Retrieved at <<http://www.ece.gatech.edu/research/labs/bwn/radio.pdf>>, Computer Networks 50 (2006), pp. 2127-2159, 2006.
Engstrom, et al., "Clear Channel Assessment in Wireless Sensor Networks", Retrieved at <<http://www.cse.sc.edu/~yoncek/REU/EngstromPaper.pdf>>, pp. 6, 2007.
Keshavarzian, et al., "Energy-Efficient Link Assessment in Wireless Sensor Networks", Retrieved at <<http://simula.stanford.edu/papers/wireless/sensor/WSN2.pdf>>, pp. 14, 2004.

(Continued)

*Primary Examiner* — Yemane Mesfin
*Assistant Examiner* — Khoa Huynh
(74) *Attorney, Agent, or Firm* — Turk IP Law, LLC

(57) ABSTRACT

Cognitive radio adaptation is employed in WSNs to reduce effects of RF interference. Communication channel quality is assessed locally at each node. Using beacons to propagate channel quality and node related information among the nodes of the network, channel adaptation decision is made either centrally by identifying a channel that is optimum for a majority of nodes through a tree-structure dissemination (Majority Voting Scheme) or in a distributed manner by identifying a channel where maximum interference for any node is less than maximum interference on the other channels (Veto Voting Scheme). If two channels have the same level of maximal interference, the channel with a lesser number is chosen. Channel quality assessment may be optimized based on expected interference type and/or statistical methods.

19 Claims, 12 Drawing Sheets

(56) References Cited

OTHER PUBLICATIONS

Vieira, et al., "Survey on Wireless Sensor Network Devices", Retrieved at <<http://ieeexplore.ieee.org/iel5/8826/27939/01247753.pdf?tp=&isnumber=&arnumber=1247753>>, pp. 537-544, 2003.

Sikora, Axel Dr., "Compatibility of IEEE 802.15.4 (ZigBee) with IEEE 802.11 (WLAN), Bluetooth and Microwave Ovens in 2.4 Ghz ISM-Band", Retrieved at <<www.stzedn.de/stzedn/files/stz_zigbee_coexistence.pdf>>, pp. 1-16, 2004.

Won, et al., "Adaptive Radio Channel Allocation for Supporting Coexistence of 802.15.4 and 802.11b", Retrieved at <<http://ieeexplore.ieee.org/iel5/10422/33099/01559004.pdf?tp=&isnumber=33099&arnumber=1559004>>, pp. 2522-2526, 2005.

Pollin, et al., "Distributed Cognitive Coexistence of 802.15.4 with 802.11", Retrieved at <<http://ieeexplore.ieee.org/xpl/freeabs_all.jsp?arnumber=4211136>>, pp. 5, 2006.

Akyildiz, et al., "Wireless Sensor Networks: A Survey", Retrieved at <<http://www.ece.gatech.edu/research/labs/bwn/sensornets.pdf>>, Computer Networks 38 (2002), pp. 393-422, 2002.

"MSP430x1xx Family User's Guide. s.l. : Texas Instrument Product Documentation, 2004.", Retrieved at << http://www.h-pt.com/download/down.php?no=1089331448MSP430x1xx_Errata.pdf>>, Jun. 2004, pp. 10, 2004.

"Imote2 Hardware Reference Manual", Retrieved at <<http://www.xbow.com/Support/Support_pdf_files/Imote2_Hardware_Reference_Manual.pdf>>, pp. 30, 2007.

Dunkels, et al., "Contiki—A Lightweight and Flexible Operating System for Tiny Networked Sensors", Retrieved at<<http://www.sics.se/~adam/dunkels04contiki.pdf>>, pp. 8, 2004.

Han, et al., "A Dynamic Operating System for Sensor Nodes", Retrieved at <<http://www.cs.ucla.edu/~kohler/pubs/hanO5dynamic.pdf>>, pp. 14, 2005.

Levis, et al., "The Emergence of Networking Abstractions and Techniques in TinyOS", Retrieved at <<http://berkeley.intel-research.net/dgay/pubs/04-nsdi-tinyos.pdf>>, pp. 14, 2004.

"Introducing the .NET Micro Framework. s.l. : Microsoft Corporation, Sep. 2007.", Retrieved at <<http://whitepapers.zdnet.com/abstract.aspx?docid=349541>>, Sep. 2007, pp. 3, 2007.

Zimmermann, Hubert, "OSI Reference Model—The ISO Model of Architecture for Open Systems Interconnection", Retrieved at <<http://www.comsoc.org/livepubs/50_journals/pdf/RightsManagement_eid=136833.pdf>>, IEEE Transactions on Communications, vol. COM-28, No. 4, Apr. 1980, pp. 425-432, 1980.

Jayasuriya, et al., "Hidden vs Exposed Terminal Problem in Ad Hoc Networks", Retrieved at <<http://www.itr.unisa.edu.au/~sgordon/doc/jayasuriya2004-hidden.pdf>>, pp. 8, 2004.

Srivastava, et al., "Cross-Layer Design: A survey and the Road Ahead", Retrieved at <<http://ieeexplore.ieee.org/iel5/35/33162/01561928.pdf>>, IEEE Communications Magazine, Dec. 2005, pp. 112-119, 2005.

Jondral, Friedrich K., "Software-Defined Radio—Basics and Evolution to Cognitive Radio", Retrieved at <<www.hindawi.com/getpdf.aspx?doi=10.1155/wcn.2005.275>>, EURASIP Journal on Wireless Communications and Networking 2005:3, Feb. 24, 2005,pp. 275-283, 2005.

Mo, et al., "Comparison of Multi-Channel MAC protocols", Retrieved at <<http://ieeexplore.ieee.org/iel5/7755/4387793/04359013.pdf?tp=&isnumber=&arnumber=4359013>>, IEEE Transactions on Mobile Computing, vol. 7, No. 1, Jan. 2008, pp. 50-65, 2008.

Tseng, et al., "A Multi-Channel MAC protocol with Power Control for Multi-hop Mobile Ad-hoc Networks", Retrieved at <<http://ieeexplore.ieee.org/stamp/stamp.jsp?arnumber=00918739>>, pp. 419-424, 2001.

Hung, et al., "A Dynamic Multi-Channel MAC for Ad-hoc Networks", Retrieved at <<http://www.ee.ryerson.ca/~eddie/Papers/2002_04_05_biennial_symp.pdf>>, 21St Biennial Symposium on Communications, Apr. 5, 2002, Paper No. 43, pp. 5, 2002.

Wu, et al., "A New Multi-Channel MAC Protocol with on Demand Channel Assignment for Mobile Ad-Hoc Networks" Retrieved at <<http://ieeexplore.ieee.org/iel5/7228/19489/00900290.pdf?tp=&isnumber=&arnumber=900290>>, pp. 232-237, 2000.

Tzamaloukas, et al., "Channel-Hopping Multiple Access", Retrieved at <<http://ieeexplore.ieee.org/iel5/6882/18542/00853348.pdf?tp=&isnumber=18542&arnumber=853348>>, pp. 415-419, 2000.

Tzamaloukas, et al., "Channel-Hopping Multiple Access with Packet Trains for Ad-hoc Networks", Retrieved at <<http://www.dtic.mil/cgi-bin/GetTRDoc?AD=ADA461602&Location=U2&doc=GetTRDoc.pdf>>, pp. 7, 2000.

Chen, et al., "A New Multi Channel Access Protocol for IEEE 802.11 Ad Hoc Wireless LANs", Retrieved at <<http://ieeexplore.ieee.org/iel5/8905/28147/01259126.pdf?tp=&isnurnber=28147&arnumber=1259126>>, The 14th IEEE, 2003, International Symposium on Personal, Indoor and Mobile Radio Communication Proceedings, pp. 2291-2296, 2003.

So, et al., "Multi-Channel MAC for Ad Hoc Networks: Handling Multi-Channel Hidden Terminals Using a Single Transceiver", Retrieved at <<http://www.sigmobile.org/mobihoc/2004/presentations/p222-so.pdf>>, MobiHoc, 2004, May 24-26, Roppongi, Japan, pp. 222-233, 2004.

Maheshwari, et al., "MultiChannel MAC Protocols for Wireless Networks", Retrieved at <<http://ieeexplore.ieee.org/iel5/4068086/4068283/04068296.pdf?tp=&isnumber=&arnumber=4068296>>, IEEE Communications Society subject matter experts for publication in the IEEE SECON 2006 proceedings, pp. 393-401, 2006.

Zhou, et al., "MMSN: Multi-Frequency Media Access Control for Wireless Sensor Networks", Retrieved at <<http://www.cs.virginia.edu/papers/infocom2006.pdf>>, pp. 13, 2006.

Jovanovic, et al., "TFMAC: Multi-Channel MAC Protocol for Wireless Sensor Networks", Retrieved at <<http://ieeexplore.ieee.org/iel5/4375901/4375902/04375929.pdf?tp=&isnumber=4375902&arnumber=4375929>>, Sep. 26-28, 2007, Serbia, pp. 23-26, 2007.

Wu, et al., "Realistic and Efficient Multi-Channel Communications in Wireless Sensor Networks", Retrieved at <<http://ieeexplore.ieee.org/ie15/4509594/4509595/04509770.pdf?tp=&isnumber=4509595&arnumber=4509770>>, IEEE Communications Society subject matter experts for publication in the IEEE INFOCOM 2008 Proceedings., pp. 1867-1875, 2008.

Bahl, et al., "SSCH: Slotted Seeded Channel Hopping for Capacity Improvement in IEEE 802.11 Ad-Hoc Wireless Networks", Retrieved at <<http://research.microsoft.com/users/bahl/Papers/Pdf/SSCH.pdf>>, MobiCom'04, Sep. 26-Oct. 1, 2004, Philadelphia, pp. 15, 2004.

So, et al., "McMAC: A Parallel Rendezvous Multi-Channel MAC Protocol", Retrieved at <<http://ieeexplore.ieee.org/iel5/4204175/4224245/04224312.pdf?tp=&isnumber=&arnumber=4224312>>, pp. 334-339, 2007.

Razzaque, et al., "Cross-Layer Architectures for Autonomic Communications", Retrieved at <<http://www.simondobson.org/softcopy/jnsm-crosslayer-07.pdf>>, pp. 15, 2007. rieved at.

Shacham, et al., "Architectures and Performance of Multichannel Multihop Packet Radio Networks", Retrieved at <<http://ieeexplore.ieee.org/iel6/49/25832/01146609.pdf?tp=&isnumber=&arnumber=1146609>>, IEEE Journal on Selected Areas in Communications, vol. SAC-5, No. 6, Jul. 1987, pp. 1013-1025, 1987.

Xun, et al., "A Multi-channel MAC Protocol for Wireless Sensor Networks", Retrieved at <<http://ieeexplore.ieee.org/iel5/4019822/4019823/04019988.pdf?tp=&isnumber=4019823&arnumber=4019988>>, Proceedings of the Sixth International Conference on Computer and Information Technology (CIT'06), pp. 6, 2006.

Fall, et al., "The ns Manual", Retrieved at <<http://www.isi.edu/nsnam/ns/doc/ns_doc.pdf>>, Oct. 3, 2008, pp. 421, 2008.

"NetSim: Network Simulation Software", Retrieved at <<http://www.boson.com/AboutNetSim.html.>>, Oct. 3, 2008, pp. 2, 2008.

"Opnet Modeler: Accelerating Network R&D", Retrieved at <<http://www.opnet.com/ solutions/network_rd/modeler.html.>>, Oct. 3, 2008, pp. 2, 2008.

* cited by examiner

COGNITIVE CHANNEL ADAPTATION IN WIRELESS SENSOR NETWORKS

BACKGROUND

Wireless Sensor Networks (WSNs) are wireless networks of spatially distributed autonomous devices (called sensor nodes) that use sensors to cooperatively monitor physical or environmental conditions, such as temperature, sound, vibration, pressure, motion, pollutants, or comparable phenomena at different locations. WSNs are utilized in many application areas including environment and habitat monitoring, healthcare applications, factory automation, home automation, traffic control, and similar areas.

In addition to one or more sensors, each node in a sensor network is typically equipped with a radio transceiver or other wireless communication device, a low-power processor, and an energy source, usually a battery. The nodes of a WSN usually form a multi-hop communication mesh meaning that the intermediate nodes are used to forward data packets on the route from a source to a destination. Size and cost constraints on sensor nodes result in corresponding constraints on resources such as energy, memory, computational power, and bandwidth.

Nowadays a majority of the produced sensor nodes are equipped with low power radios such as IEEE 802.15.4 compliant radios. WSNs are often deployed in places where they have to share the radio frequency (RF) spectrum with other devices that may be using different technologies but the same RF band for data transferring. In the case of the IEEE 802.15.4 radio standard, the sensor nodes use the 2.4 GHz ISM (Industrial, Scientific and Medical) band also exploited by other radio standards such as 802.11a/b/g and Bluetooth®. The function and performance of the WSN can be harmfully influenced by more powerful near-by devices operating in the same radio frequency range.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling wireless sensor networks to react autonomously to interference and select optimum communication channel(s) or mode(s) to reduce the effects of interferences. According to some embodiments, the decision to change communication channel or mode may be based on locally gathered information by individual nodes and aggregated. Information gathering may be optimized by sampling a subset of available communication channels based on expected interference sources.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
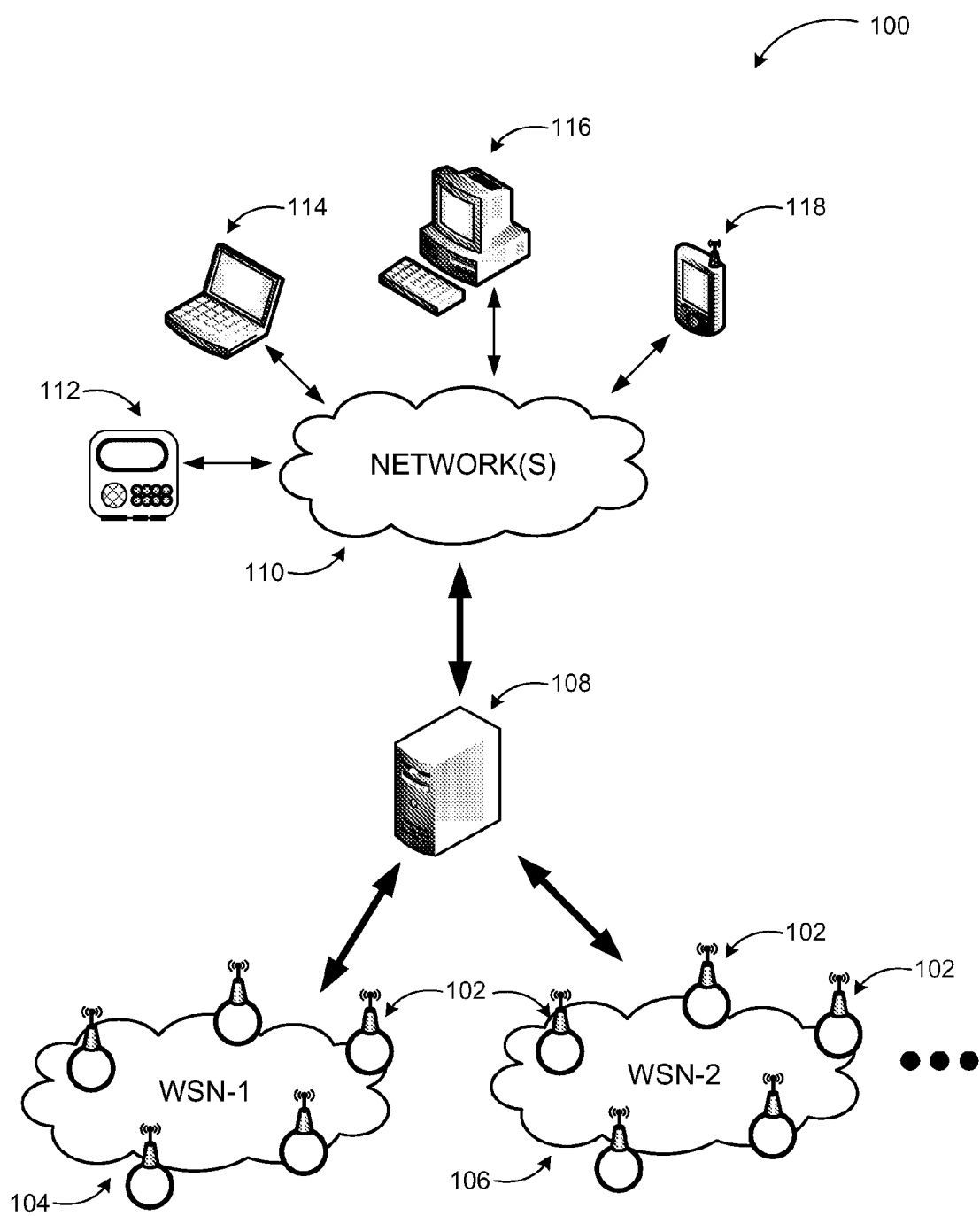
FIG. 1 illustrates an example networked environment where embodiments may be implemented.

As mentioned previously, interference from other, typically higher power, transmission sources can result in reduced performance for portions or all of a WSN. A good radio configuration for a WSN at a particular time point To may worsen later because of dynamic interferences created by new or mobile surrounding devices. Solutions involving human interaction and manual configuration of the nodes, when problems in the communication are detected, are impractical.

Embodiments are directed to dynamic adaptation to a changing radio environment in an autonomous manner by the nodes of a WSN. Wireless transceivers commonly embedded in WSN nodes typically have scanning abilities, which are used to dynamically detect local interferences. In order to stay connected, nodes outside of the interference area are then notified using broadcast messages about necessity of channel switching. The nodes may take local decisions regarding the switch to a new channel employing a variety of algorithms. The nodes are ultimately enabled to converge on a new common radio channel with better quality than the previous one. The mechanism of channel adaptation does not require time synchronization and can be implemented transparently on MAC or network layers of the protocol stack.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

FIG. 1 illustrates an example networked environment where embodiments may be implemented. Wireless sensor nodes 102 forming WSNs (e.g. WSN-1 104 and WSN-2 106) are typically small sized independent electronic devices equipped with a sensing module, a transceiver for communication with other nodes and/or a gateway (e.g. server 108), and a power module. Wireless sensors are used to measure/monitor physical or environmental conditions, such as temperature, sound, vibration, pressure, motion, pollutants, or comparable phenomena at different locations. Due to their size and use in diverse environments, wireless sensor nodes typically have limited power supply such as batteries, solar power, and similar power sources.

Most WSNs employ a gateway node, a wireless device acting as a gateway between a backbone network and the WSN, directing data between the nodes of the WSN and computers of the backbone network. Other WSNs are truly distributed where information is provided directly from each wireless sensor to the backbone network. Combinations of these two configurations are also implemented.

The backbone network may include one or more networks 110 forwarding the collected data to a number of destinations such as computing devices 112, 114, 116, 118. The backbone network(s) 110 may also include number of servers, data stores, and other devices (not shown).

Network(s) 110 may facilitate a number of devices and applications implemented in un-clustered systems or clustered systems to provide data collected by the WSNs to other devices as well as provide configuration data to the WSNs. Such systems may comprise any topology of servers, clients, Internet service providers, and communication media. Also, the systems may have a static or dynamic topology. Network(s) 110 may include a secure network such as an enterprise network, an unsecure network such as a wireless open network, or the Internet. Network(s) 110 provide communication between the nodes described herein. By way of example, and not limitation, network(s) 110 may include wireless media such as acoustic, RF, infrared and other wireless media.

Many other configurations of computing devices, applications, data sources, and data distribution systems may be employed to implement a WSN system with cognitive channel adaptation. Furthermore, the networked environments discussed in FIG. 1 are for illustration purposes only. Embodiments are not limited to the example applications, modules, or processes.

Figure 2:
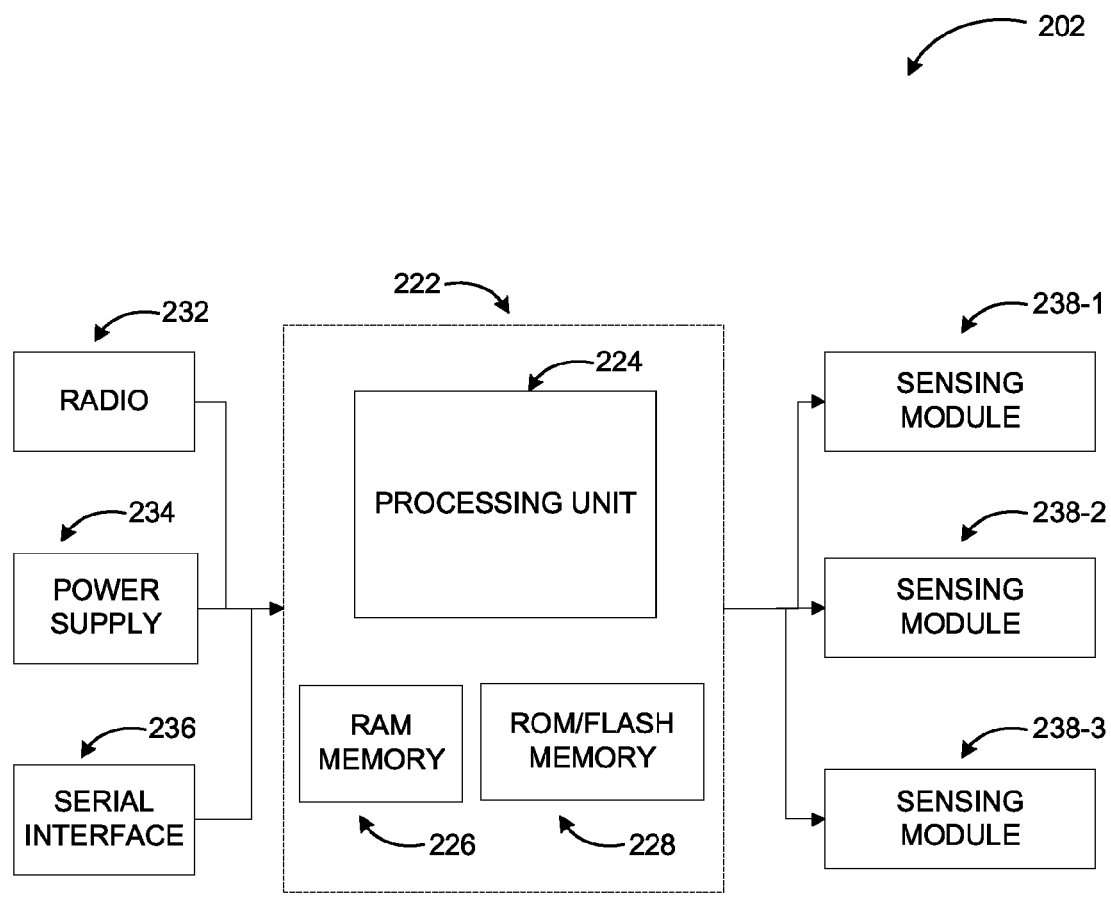
FIG. 2 illustrates major operational components of an example wireless sensor node.

FIG. 2 and the associated discussion below are intended to provide a brief, general description of a suitable hardware environment in which embodiments may be implemented. With reference to FIG. 2, major operational components of an example wireless sensor node 202 are illustrated. In a basic configuration, wireless sensor 202 may include a core module 222 with a processing unit 224 and system memory. System memory may include volatile (such as RAM 226) and non-volatile (such as ROM, flash memory 228). ROM, flash memory 228 may include an operating system suitable for controlling the operation of the sensor 202.

Data received from one or more sensing modules 238-1 through 238-3 may be stored in RAM memory 226 before being transmitted. RAM memory 226 may also be used to store data generated by any program modules executed by the processing unit 224 temporarily. Other program modules stored in ROM, flash memory 228 and executed by processing unit 224 may include communication programs for managing radio module 232, power monitoring programs interfacing power supply module 234, data collection programs configuring the operation of associated sensing modules 238-1 through 238-3, and interference detection and channel switch programs for implementing an algorithm according to embodiments. Serial interface 236 is an example for a direct interface to the core module of wireless sensor 202. Serial interface 236 or similar interfaces (e.g. parallel, optical) may be used to configure the wireless sensor, upload program modules, and similar operations.

Power supply module 234 provides power to the remaining modules of the wireless sensor 202. In an exemplary implementation, power supply module 234 may include a battery, a solar power panel, an RF energy converter, or similar limited power sources. Wireless sensors implementing cognitive channel adaptation are not limited to battery or solar power though. Other forms of power such as electrical power from the public electricity network or a private network may also be used to power some wireless sensors. Moreover, wireless sensor 202 with its shown components is an example for illustration purposes only. Embodiments may be implemented in wireless sensors with additional or fewer components. For example, auxiliary modules such as a Global Positioning System (GPS) module may be embedded in the sensor to associate collected sensor data with accurate location data.

Radio module 232 is a transceiver communicating with neighboring nodes and/or a gateway using a predefined frequency band and modulation technique. References are made throughout the specification to IEEE 802.15.4 standard. Radio module 232 of a wireless sensor according to embodiments is not limited to this standard, however. Many other frequencies (frequency ranges), modulation types, and transmission modes may also be used in a system according to embodiments. Essentially, embodiments may be implemented in any wireless transceiver system, where the radio protocol enables use of a channel among a plurality of available channels for communication among participating network nodes.

While specific devices and modules have been described above, these are for illustration purposes only and do not constitute a limitation on embodiments. Many other hardware environments, modules, and operations may be implemented using the principles described herein.

Operation of WSNs strongly depends on connectivity among the nodes. As mentioned before, sensor nodes typically possess a restricted set of resources. Thus, the nodes are able to solve problems exceeding capabilities of a single device through cooperation. If two nodes need to exchange data, they have to employ a common communication channel for transmission. If the operational communication channel is fixed at the time of deployment and cannot be adapted dynamically, any source of interference on it may jeopardize functioning of the network. Due to limitations on computational resources and power supply, wireless communication technology utilized by WSNs may use narrow band transmission such as IEEE 802.15.4 compliant transmission. Embodiments are not limited to IEEE 802.15.4 compliant radios, however. A system according to embodiments may be implemented utilizing any RF communication mode with distinct and selectable channels. Thus, a communication channel may include a frequency of wireless transmission, a bandwidth, a modulation type of wireless transmission, and similar aspects.

Channel selection process in a WSN according to embodiments may employ a number of mechanisms. For example, a first mechanism may be channel assessment. Through this mechanism, information about the local environment of a node may be collected and metrics of channel precedence defined. Applying the first mechanism, each node may assess interference of available channels and grade them according to a quality metric. A second mechanism may be channel agreement. This mechanism may specify the rules of channel selection: when to switch and which channel to choose. If each node is allowed to make a decision to switch without any global knowledge, it may be difficult or impossible for the whole system to converge and some parts of the network may be stuck in suboptimal solutions.

In a WSN according to embodiments, optimality under conditions of unknown network topology is guaranteed by ensuring that at least one node has a global view of the whole network and a mechanism of global data collection is specified. Using the global data collection mechanism, the nodes can exchange data to get complete knowledge of the environment the network is operating in. A channel switching decision may then be made either in a distributed manner or by some central entity depending on the needs of a particular system.

In a multi-hop 802.15.4 packet radio network consisting of nodes of equal importance, a mixed connectivity pattern is assumed: on some channels nodes hear one another symmetrically (if node m hears node n then node n hears node m); on the others connectivity may be asymmetric. If a single half-duplex transmitter is used, nodes are able to send and receive data only on one channel at a time. While having cognitive ability (capable of scanning the energy level on the available channels), the nodes can change their operational channels at the cost of increased energy consumption. Thus, a mechanism that is inefficient in switching channels, thereby consuming increased energy, may be impractical to implement in a WSN with limited power sources.

To address typical constraints of WSNs, a system according to embodiments is scalable and the amount of necessary communication is independent of the number of nodes in the network. It can also be implemented in a distributed manner in order to evade bottlenecks. However, according to other embodiments, such a system may be centrally or in-part centrally controlled (i.e. local environment information is collected and channel switching decision is made by one or a limited number of nodes for all nodes in the network). Moreover, the system may increase optimality of the selected channel and provide predictability of the convergence time.

Figure 3:
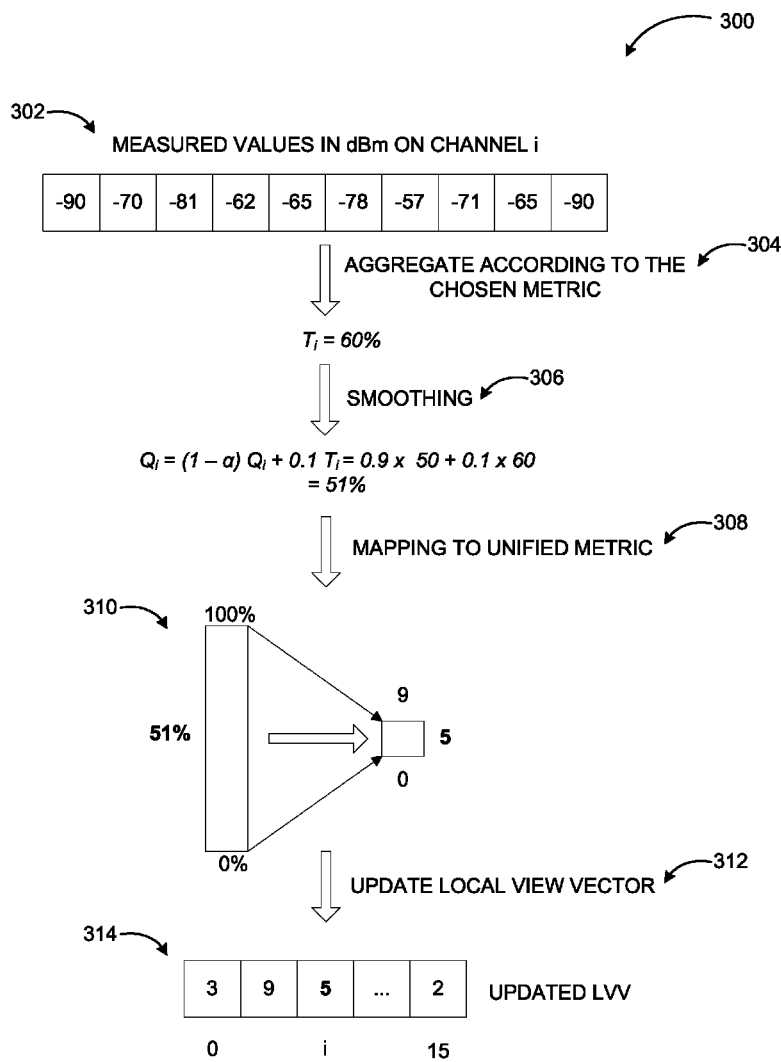
FIG. 3 is a conceptual diagram illustrating an example quality estimation process for a wireless communication channel.

FIG. 3 is a conceptual diagram illustrating an example quality estimation process for a wireless communication channel. As discussed previously, an important initial step in implementing cognitive channel adaptation in WSNs is determination of local wireless medium quality. A channel assessment process estimates channel quality in the local area of a sensor node.

In many WSNs, due to lack of any additional hardware support, the access to the physical medium is usually based on the Clear Channel Assessment (CCA) mechanism. CCA is a logical function implemented within a MAC (Medium Access Control) layer (part of the link layer), which determines whether the wireless medium is busy or not. A majority of radios include this functionality, because many wireless protocols use it to address the contention problem (for example, when using CSMA-CA types of MAC protocols). Wireless transceivers of a sensor node according to embodiments also include energy detection ability. Energy detection is a measurement of power in the received radio signal within the bandwidth of the channel. It is expressed in arbitrary units and often used to implement CCA functionality. When the level of energy exceeds a predefined threshold, the medium is perceived to be busy. The energy value may be expressed as an eight bit integer number ranging from 0 to 255, although other methods of designating the energy value may also be used.

The level of energy may be used to estimate the amount of communication taking place on the channel, but this information alone is not sufficient to determine channel quality. Exploiting raw energy values, it is impossible for a node to distinguish whether the communication occurs between its neighbors or between devices outside of the network. To counter this ambiguity, power emission information of the node may be included in its beacons or broadcast messages. In this case the node's neighbors may take it into account estimating channel interference in their local area. Alternatively, the ability of some radios to determine whether received packets belong to the node's network or not may also be used to distinguish WSN communication from outside network interference. The decision may be based on preambles of the received packets. If the node detects a high level of energy on a particular channel, but cannot identify the preamble, it may assume the transmission belongs to outside devices.

Thus, with a set of energy values and knowledge whether the emitted energy belongs to the neighbors or other devices, it is possible to estimate the channel quality locally. Samples of high energy, belonging to the WSN communication, may be simply discarded. Using the remaining samples, the channel quality may be calculated by applying a defined metric, such as an average or mean of energy, cardinality of different energy values, a threshold function, or possibly others. An average ($A_c$) refers to the middle value of the collected set and is calculated by formula [1].

$$A_C = \frac{E_{C1} + \dots + E_{CN}}{N}, \qquad [1]$$

where C is a sampled channel, N is the number of samples and $E_{Ci}$ is the i-th energy value sampled on the channel C. A median ($Me_c$) separates the higher half of the samples from the lower half and can be calculated by sorting the energy values of the set in ascending order and taking the middle element. A cardinality function ($Card_c$) counts the number of unique energy values in the collected set. The cardinality function usually has lower values on the channels without interference, because silent channels are usually more stable. A threshold aggregation function ($T_c$) calculates the percentage of energy values above a predefined threshold. $T_c$ expresses the time when the channel is busy due to data transferring. The choice of the appropriate metric, including other metrics than those discussed above, may be based on specific circumstances of each WSN, and is not further described here.

Referring back to diagram 300 of FIG. 3, the example quality estimation process begins with measurement of energy values on a given channel $C_i$ (302). This may be done by sampling the channel N times obtaining N energy values in total. The high energy values related to the WSN's packets are discarded. Based on the collected set, the node may calculate (304) the channel quality $M_{C_i}$ according to the chosen metric ($M_c \in \{A_c, Me_c, Card_c, T_c\}$). Then, the smoothed (306) quality $Q_{C_i}$ is calculated employing a history factor $\alpha$ and the formula [2].

$$Q_{C_i} = \begin{cases} M_{C_i}, & \text{if } Q_{C_i} = 0, \\ Q_{C_i} * (1-\alpha) + \alpha * M_{C_i}, & \text{if } Q_{C_i} \neq 0. \end{cases} \quad [2]$$

Value $Q_{C_i}$ represents the quality characteristic of the channel $C_i$ and may be smoothed in order to prevent quality peaks and drops which can be caused by short term interference. From this point on, the metric is linearly mapped (308) to a unified channel quality metric (310).

The unified channel quality metric 310 is a measurement of channel interference in generic units. It may be used to decide which of two channels is more preferable for communication. According to some embodiments, the metric may be represented by a four bit value, and support 10 different values of the channel quality. The minimum value (zero) indicates that there is no communication on the channel. The maximum value (nine) means that the channel has the most significant interference (consequently, packet loss) and is undesirable for data transferring. Based on the granularity of this metric, sensor nodes are able to make a decision about the necessity of channel switch. Limiting the value to four bits per channel (or similar number), the metric's representation enables exchange of quality information among the nodes with little overhead.

Thus, the local environment of the node can be described by an updated (312) Local View Vector (LVV) 314, which includes information about interference on all the channels. Each element of the vector contains a value of the unified quality metric 310 for the respective channel.

Figure 4:
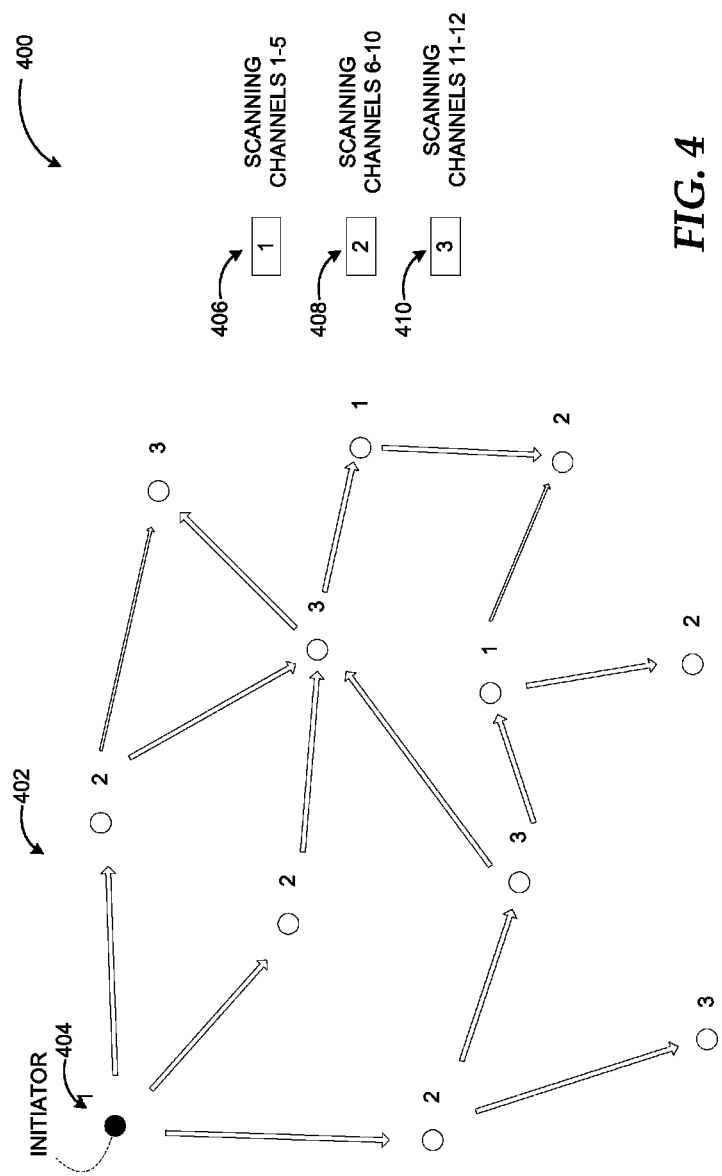
FIG. 4 illustrates a tree based distributed scanning approach that may be used in determining the quality of radio environment in a system according to embodiments.

FIG. 4 illustrates a tree based distributed scanning approach that may be used in determining the quality of radio environment in a system according to embodiments. Providing information on a number of channels (e.g. 16 channels of the IEEE 802.15.4 standard), the channel assessment process may take significant time. Channel switching also consumes more energy compared to an idle operational mode. Furthermore, a node is not able to send and receive data while sampling the channel(s) for energy. This may potentially increase packet loss. According to one embodiment, the sampling time may be reduced without impacting the interference detection ability by sampling not all but only subset of the channels.

Two types of channel assessment procedures may be defined: deterministic and probabilistic. Deterministic procedures guarantee coverage of all the channels in some particular region assuming that interference of the nodes in the region is similar. For determinism, either all channels have to be scanned by each device, or some form of collaboration among nodes is performed. The tree-based distributed scanning approach illustrated inn diagram 400 of FIG. 4 is an example deterministic scheme. According to this scheme, a simple spanning tree 402 may be built for a channel assignment. Each node may be assigned a subset of channels depending on the number of hops from the root of the tree (404). This procedure provides assessment of all the channels for each of the nodes within 2 hops distance area. It reduces the number of channels to be scanned from 16 to 5 as shown in subsets 406, 408, and 410, saving significant energy but requiring root node election and construction of the tree.

Figure 5:
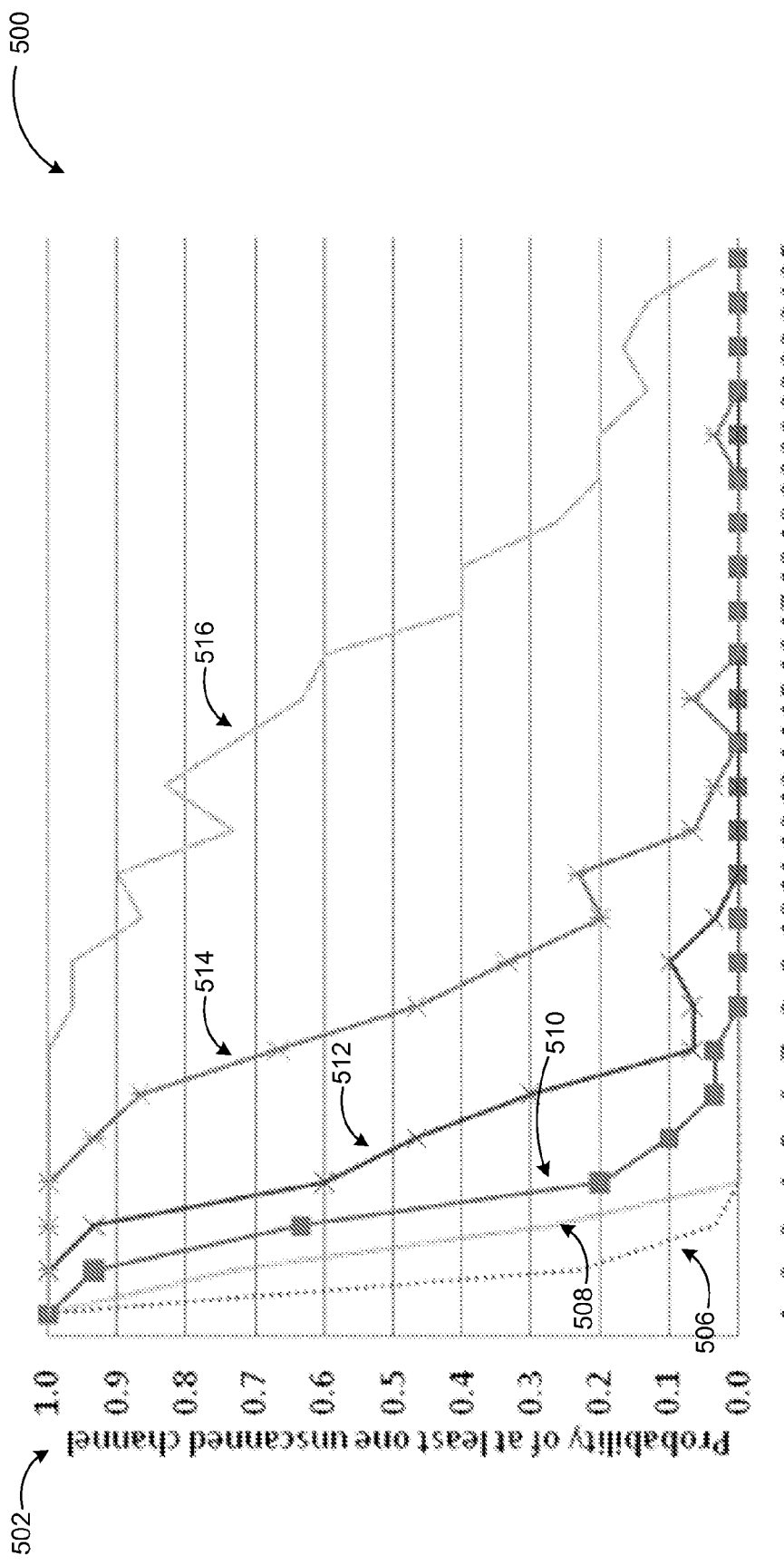
FIG. 5 is a diagram of an example probabilistic uniform sampling scheme for interference detection.

FIG. 5 is a diagram of an example probabilistic uniform sampling scheme for interference detection. Probabilistic approaches maximize the probability of scanning all the channels without giving strict guarantees. Because of redundancy, it is sufficient for each node to sample only random subset of the channels. This subset may be built without any or utilizing only local information such as the number of the node's neighbors.

Diagram 500 depicts the simulation results of a probabilistic uniform sampling scheme. According to the example model, every node scans N uniformly distributed random channels (e.g. N is 4, 6, 8, 10, 12 and 14). Simulation may be performed for different numbers of interfered nodes (horizontal axis 504) on a random graph topology. Vertical axis 502 represents the probability of interference detection depending on the number of sampled channels. Each value in the graph may be averaged over a predefined number of runs.

Different curves (506 through 516) represent number of scanned channels as listed in the diagram. As the diagram shows, scanning of 10 random channels per node may be sufficient to detect interferences covering six or more nodes. This approach enables significant reduction of the amount of consumed energy and scanning time without introducing any communication overhead.

Figure 6:
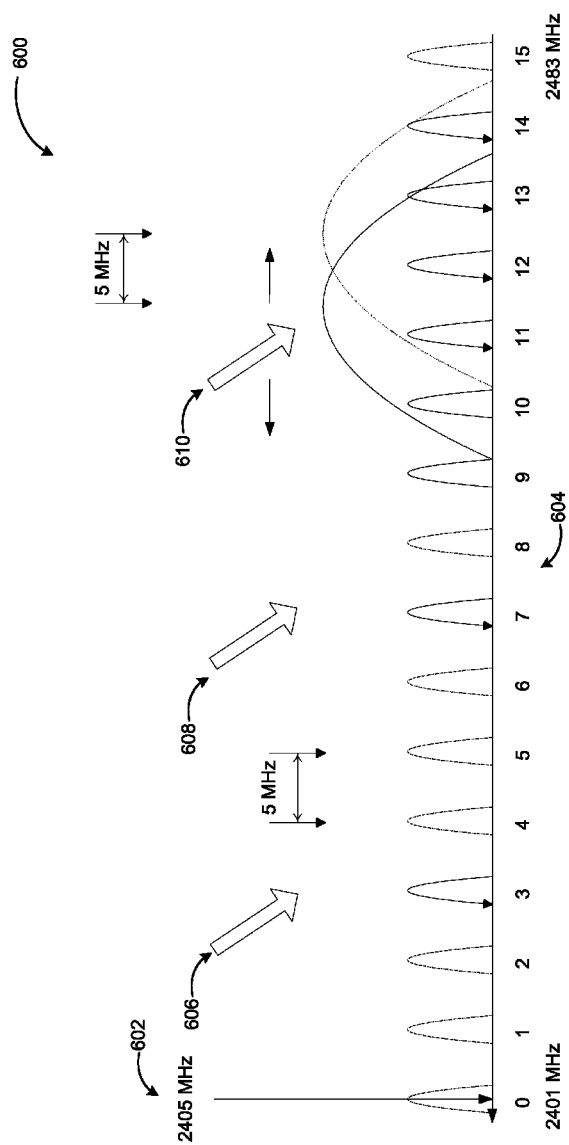
FIG. 6 is a diagram illustrating optimized interference detection for an IEEE 802.11 type interference source.

FIG. 6 is a diagram illustrating optimized interference detection for an IEEE 802.11 type interference source. Wireless Local Area Networks (WLANs) using IEEE 802.11 standard are commonly used in a large number of locations. If the source of interference such as an IEEE 802.11 WLAN device is known, the number of scanned channels may be reduced even further.

Having bandwidth of 22 MHz, each 802.11 channel occupies 4 channels of a transceiver employing 802.15.4 standard. Thus, sampling only every forth channel may be sufficient to find existing interference. When the interference is detected, neighboring channels may be checked to identify the interference's borders. Diagram 600 shows individual channels of a 802.15.4 transceiver starting at 2.405 GHz (602) along the frequency spectrum (604) limited to the ISM band (2.401-2.483 GHz). A node in a WSN according to one embodiment may start scanning every fourth channel (606, 608) until it detects interference (610).

In the example scenario, communication between competitive devices occurs on channel 11 of the 802.11 standard. In order to identify the borders the node may continue scanning in both directions checking channels 10, 9, 12, 13, and 14 of the 802.15.4 standard. Thus, instead of 16 channels the node scans only 8. If there is no other interference only 4 channels out of 16 are scanned. According to another embodiment, this scheme may be combined with probabilistic approaches significantly reducing the number of scanned channels per node. According to further embodiments, an expected interference pattern generally may be taken into consideration based on a transmission type of an expected interference source, a time of day, a location of each wireless sensor node, or a usage pattern for the expected interference source.

The algorithms, data formats, metrics, and schemes for channel quality assessment described in FIG. 3 through FIG. 6 are for illustration purposes and do not constitute a limitation on embodiments. Other algorithms, data formats, metrics, and schemes may be used in various combinations to implement channel assessment aspect of providing cognitive channel adaptation in WSNs using the principles described herein.

Figure 7:
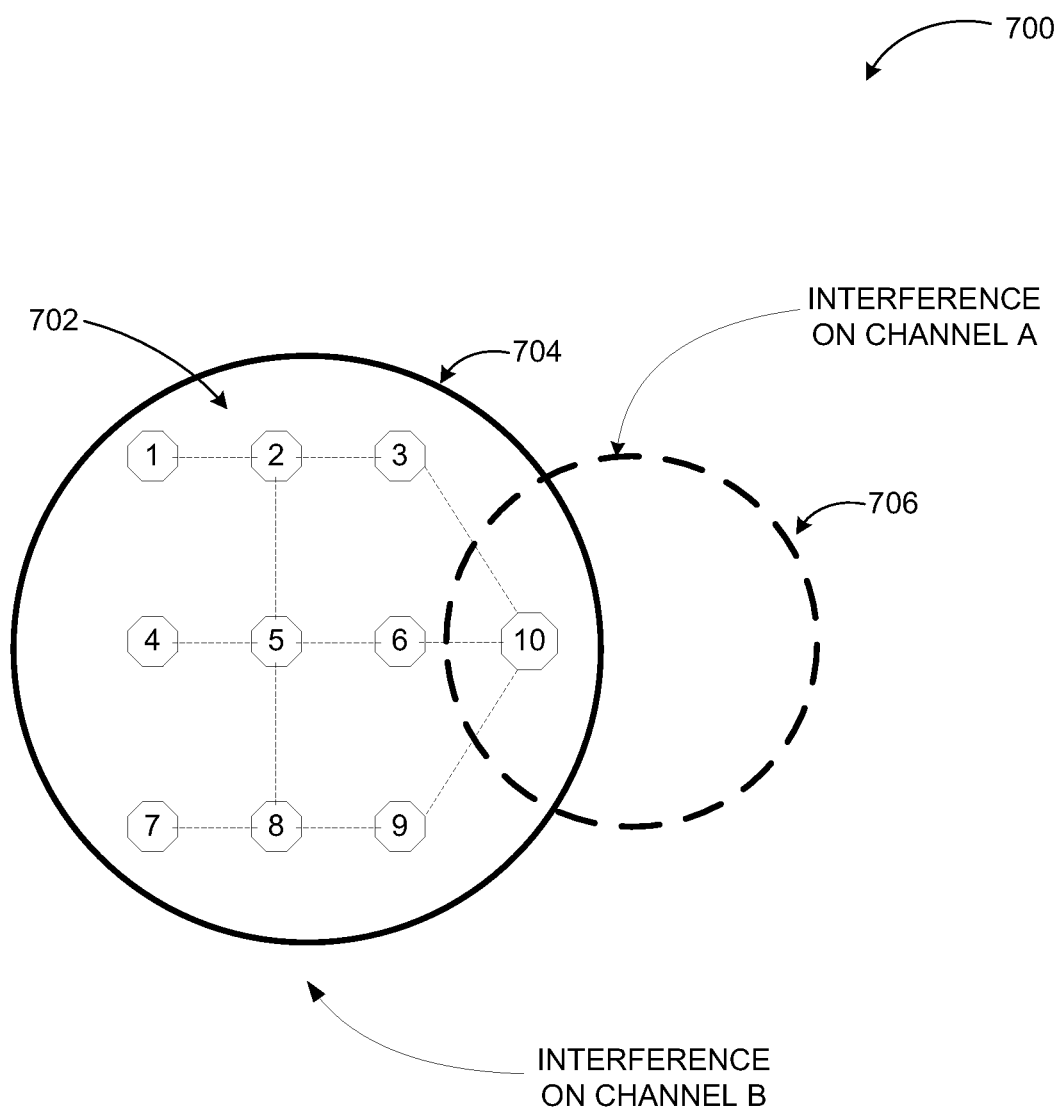
FIG. 7 is a conceptual diagram illustrating example Veto Voting Scheme (VVS) and Majority Voting Scheme (MVS) algorithms according to embodiments.

FIG. 7 is a conceptual diagram illustrating example Veto Voting Scheme (VVS) and Majority Voting Scheme (MVS) algorithms according to embodiments. As discussed previously, channel agreement is another important aspect of implementing cognitive radio adaptation in WSNs. Providing the known local environment of the nodes, the network is enabled to agree on a common channel in a centralized or distributed manner.

According to one embodiment, a Veto Voting Scheme (VVS) may be implemented in a WSN consisting of nodes of equal importance. The network is considered operational if it does not have logical partitions (every node uses the same channel as its neighbors). All nodes are considered critical, so that if at least one node cannot exchange data on channel N, the channel becomes unacceptable for the whole network. Thus, the VVS algorithm minimizes maximal interference on the channel. It selects a channel such that the maximum interference for all nodes on this channel is less than maximum interference on the other channels. The most preferable channel $C_{pr}$ may be identified using formula [3].

$$C_{pr}, \text{ such that } \max_{j \in \{N\}}(I_{prj}) \leq \max_{j \in \{N\}}(I_{kj}), \text{ for } \forall k \in \{C\}, k \neq pr, \quad [3]$$

where $\{C\}$ is a set of available channels, $\{N\}$ is a set of available nodes and $I_{kj}$ is interference on channel k for node j.

As shown in diagram 700, WSN 702 consists of ten nodes (1 through 10). According to the example scenario, each node can communicate on two channels: A (706) and B (704). Channel A (706) is free for nodes from one to nine but is 90%-busy for node ten. On the other hand, channel B (704) is 60%-busy for all of the nodes. The algorithm minimizes the maximum interference by using formula [4] below and preferring channel B (704) to channel A (706).

$$\min(\max(0,90), \max(60)) = 60. \quad [4]$$

Under the VVS scheme, the local environment is sampled and broadcast messages are used to propagate the collected information throughout the network. Giving an identical global view of the channel quality, the nodes are able to choose a common operational channel satisfying all the participants. The algorithm is completely distributed and does not require any form of clustering or central entities.

As mentioned previously, the VVS algorithm minimizes the maximal interference on the channel. Initially each node randomly chooses a primary channel $C_{pr}$. Periodically the node iterates through the other channels and assesses those using the scanning capabilities of the radio. The evaluation of the channels is done according to the Channel Assessment process discussed previously. The result of the process is a so-called local view vector (LVV) that estimates interference in the local area around the node. LVV contains N quality values given in the unified units (values from zero to nine for each of the N channels). The busiest channels have nines in the vector slots with the corresponding indices; the slots of free channels contain zeroes:

$$LVV[C_i] = \begin{cases} 9, & \text{if channel } C_i \text{ is the busiest} \\ \ldots \\ 0, & \text{if channel } C_i \text{ is free} \end{cases} \quad [5]$$

If interference on the current primary channel becomes too high, the node is allowed to change the operational channel. The LVV vector reflects only the local environment of the node and is updated according to the discussed channel assessment procedure with some period. In addition, each node has a global view vector ($GVV_{cur}$), firstly initialized with zeroes. The value of this vector is updated as soon as new information about the local environment of the node becomes available:

$$GVV_{cur} = \max(GVV_{cur}, LVV), \quad [6]$$

where $\max(V_1, V_2) = V_3$ such that $V_3[i] = \max(V_1[i], V_2[i])$ for all appropriate i. In order to propagate the global information, each node has to iterate periodically through all the channels and beacon on them according to one of the beaconing schemes. Due to the short time of channel switching and beaconing, the probability to miss a data packet on the primary channel is likely to be negligible.

According to some scenarios, the network may stand a logical partition or failure of some part of the nodes. In such cases, it may be desirable to identify a channel that guarantees best performance not for all but at least for the majority of the nodes. For such scenarios, a Majority Voting Scheme (MVS) may be used according to another embodiment. The MVS algorithm aggregates channel quality data based on a spanning tree of the network. Having aggregated channel quality information, the designated root of the network is able to identify the best channel and propagate it down the tree. The root chooses the channel that has minimal weighted interference. The most preferable channel may be identified according to formula [7].

$$C_{pr}, \text{ such that } \sum_{j \in \{N\}} w_j I_{prj} \leq \sum_{j \in \{N\}} w_j I_{kj}, \text{ for } \forall k \in \{C\}, k \neq pr, \quad [7]$$

where $\{C\}$ is a set of available channels, $\{N\}$ is a set of available nodes and $I_{kj}$ is interference on channel k for node j, $w_j$ is a weight of a node (further, we assume all nodes are equal taking $w_j = 1$).

In the example scenario depicted in diagram 700, MVS chooses channel A (706), because the sum of interference for all nodes 702 on channel A (706) is less than the one on channel B (704): 90<10*60. Due to the overall interference information available to the root node, the MVS approach is more generic than VVS. MVS enables specification of different metrics of channel quality. On the other hand, this algorithm may introduce more overhead than VVS requiring election of a root node and building a spanning tree.

According to some embodiments, the VVS and MVS methods are implemented using receiver-directed data transmission (RDT). According to this model, each node uses a fixed channel for receiving, to which it is tuned in idle and receiving states (most of the time), also referred to as primary (or operational) channel $C_{pr}$. Different nodes may have different primary channels. The primary channel of a node may be changed over time because of the local interference or an agreement with other nodes.

Two types of communication between nodes are also distinguished: data and beacon exchange. Data exchange takes place only between neighbors with matching primary channels. For beacon exchange, RDT may be used: in order to transmit a beacon, the node tunes the radio to the operational channel of an intended receiver, sends the packet and switches back to the own primary channel. Beaconing assumes one-way data transfers: nodes are able to send beacons on different channels but receiving takes place only on the primary channel. If the transmitted message is sufficiently small, no messages are lost on the primary channel of the sending node.

Figure 8:
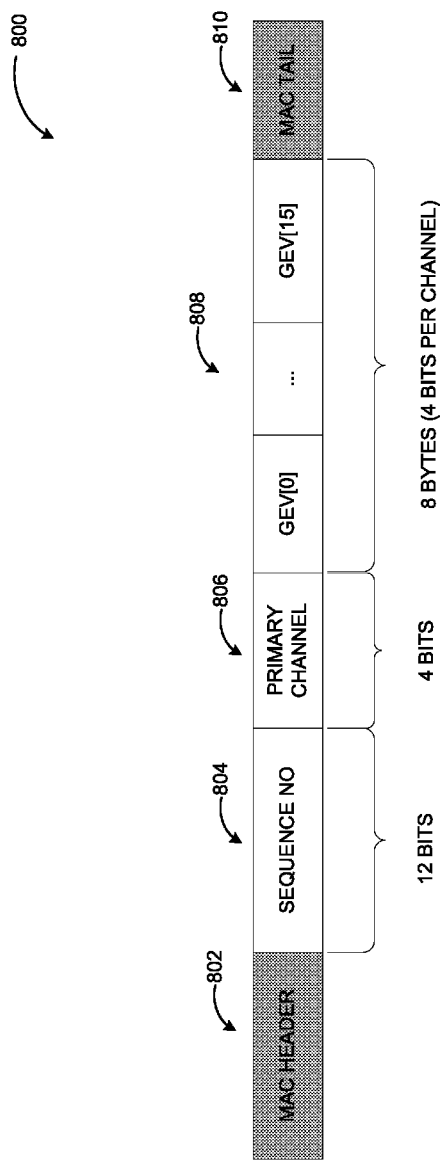
FIG. 8 illustrates the example format of a VVS beacon.

FIG. 8 illustrates the example format of a VVS beacon. In the VVS and MVS approaches, information about interference is included in beacons. In order to propagate it, nodes have to beacon constantly on all channels. Even if the channel is noisy, the node must send a beacon on the interfered channel due to non-zero probability that the local environment of the node's neighbors is different (this can happen in case of asynchronous model of connectivity) and the channel is used as primary by some of the neighbors. Different beaconing models may be implemented according to various embodiments.

According to one embodiment, a periodic approach may be taken. Every node in the network beacons all the time with the same frequency on all channels in a round-robin manner. The beaconing period is predefined at the deployment phase and does not depend on any external events (such as changes of the local environment or receipts of beacons with some new information). For acceptable convergence time, however, the interval between two beacons has to be small. This consumes energy and processing resources. Taking into consideration that stable periods are usually much longer then periods of emerging interference, beaconing with the same interval may be redundant a majority of the time.

According to another embodiment, beacon intervals may be dynamically adapted. Nodes may beacon on the channels in a round-robin manner but adapt the beaconing interval depending on external events. This method distinguishes two phases that change each other periodically: stable and aggressive modes. In stable mode, when no changes happen, the propagation of beacons may be performed in a slow manner. Period of time between two sequential beacons may be set comparatively long in order to save energy. After any external event, a node may switch to aggressive mode, significantly decreasing beacon interval for a short period of time T to propagate new information across the network. After time T, the node may return to stable mode. Implementing this method energy consumption may be decreased due to reduction of number of beacons during stable periods.

According to a further embodiment, beacons are sent in aggressive mode not on all, but only on those channels that have listening nodes with high probability. These are the channels that have been left by the node recently and the known primary channels of the node's neighbors. Compared to the periodic and aggressive schemes, this approach is more efficient in terms of energy consumption and convergence time.

A format of the beacon as shown in diagram 800 may begin with a MAC header 802, followed by the data-containing section consisting of the following parts: a sequence number 804, a primary channel of the node 806 and a $GVV_{cur}$ vector 808, followed by the MAC tail 810. The sequence number 804 is used to reset the old state of the channel from the current value back to zero if the channel becomes free again. Each node receiving the beacon may update its own $GVV_{cur}$ according to the formula [8]:

$$GVV_{cur} = \max(GVV_{recv}, GVV_{cur}), \text{ where max is from the formula [5].} \quad [8]$$

Figure 9:
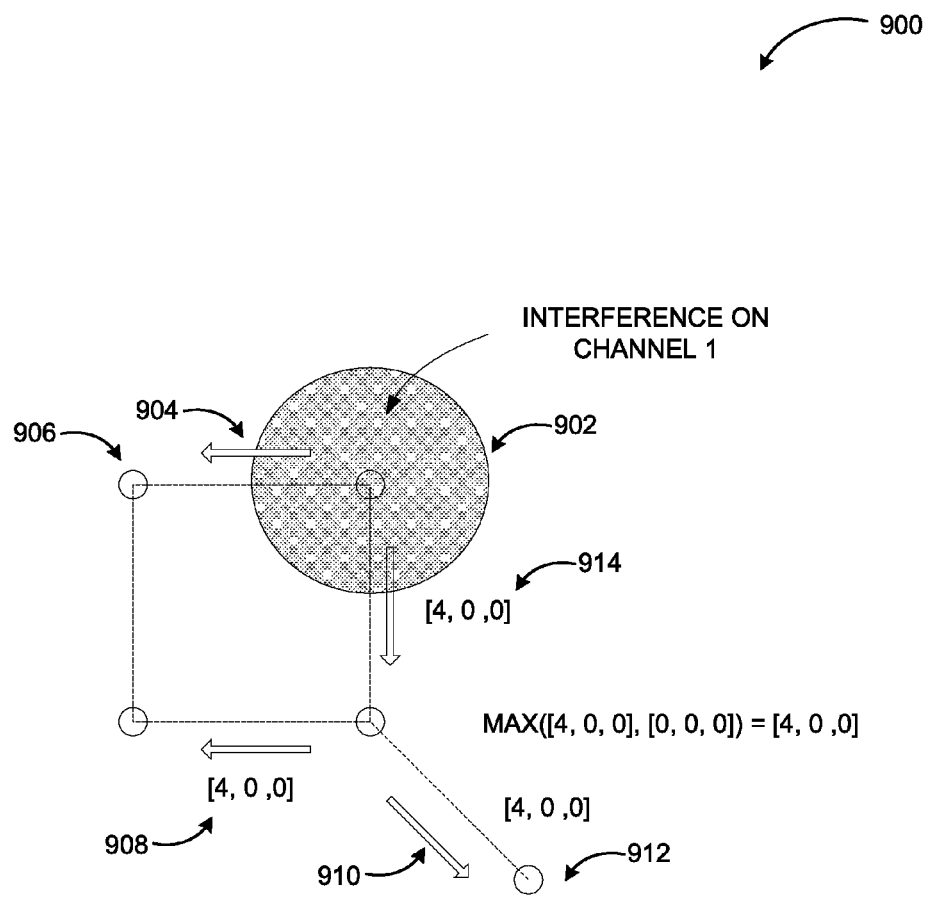
FIG. 9 is a diagram illustrating an example VVS aggregation scheme.

FIG. 9 is a diagram illustrating an example VVS aggregation scheme. As shown in diagram 900, the aggregated information propagates across the network when interference on a channel (channel 1) 902 is detected. The propagation of the information in form of GVV is shown by arrows 904, 908, 910, and 914 to other nodes such as nodes 906 or 912. At some point in time all nodes possess the global view of the network. Having this data, each node is able to find the best available channel and switch to it. The nodes may update their primary channel each time the GVV is changed according to the following procedure: if there exists channel $C_i$, such that $GVV[C_i] < GVV[C_{pr}]$, the node changes its primary channel to $C_i$. On the other hand, if there are two channels with equal interference, the one with the lesser channel number is preferred. Thus, after some period of time, the whole network switches to the same most silent channel.

After a period of aggregation, the GVV may represent a vector filled in with all maximum values, even though some channels may have been freed. This happens because if channel $C_i$ has been busy at any point in time, the $GVV[C_i]$ will contain a comparatively large value (due to prevailing maximum values in the formula [8]). In order to renew the information about recently freed channels, the GVV vector is associated with a sequence number as shown in FIG. 8. When a node realizes that all channels are seemingly busy (or some interference disappeared), it may increments its GVV sequence number and reset GVV to zeroes. Each node that receives the GVV with the sequence number greater than its current one has to update it according to the following formula:

$$GVV_{cur} = GVV_{recv}. \quad [9]$$

Formula [9] represents resetting of the network environment when all channels are presumably busy. The generalization of formulas [6]-[9] may be given as:

$$GVV_{cur} = \begin{cases} \max(GVV_{cur}, LVV), & \text{when new } LVV \text{ is available,} \\ \max(GVV_{cur}, GVV_{recv}), & \text{when } seqNo_{recv} \text{ is equal to } seqNo_{cur}, \\ \max(GVV_{recv}), & \text{when } seqNo_{recv} \text{ is greater than } seqNo_{cur}. \end{cases} \quad [10]$$

The Veto Voting Scheme is advantageous due to its simplicity, distributed nature, and the fact that it enables slow propagation of the aggregated information. On the other hand, using the aggregated information according to VVS, it may be impossible to know how many nodes actually vote for one or another channel. VVS allows one node to ban a channel for the rest of the network. Consequently, there is a probability that in large networks the GVV vector may consist of only the maximum values. In such a scenario, the channel with the least number may be chosen for a predefined period of time giving although it cannot be guaranteed that this channel is better than the others.

Figure 10:
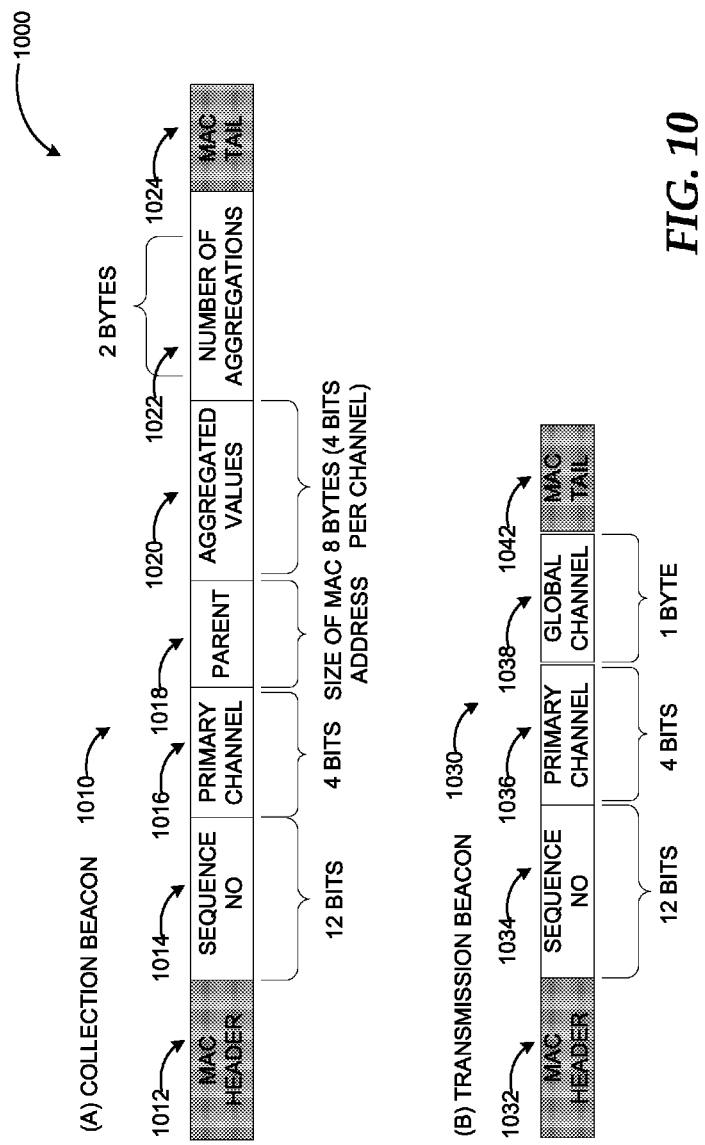
FIG. 10 illustrates example formats of different MVS beacons.

FIG. 10 illustrates example formats of different MVS beacons. The Majority Voting Scheme approach chooses a channel that performs better for the majority of the nodes. MVS uses a spanning tree allowing a root node to fetch interference information from the other nodes. The root is elected according to a predefined election procedure (for example, it may be statically chosen at the deployment time or reelected taking into consideration the available energy of the nodes).

In the MVS scheme, every node sends beacons on all channels using the previously discussed beaconing procedures. The beacon contains the address of the node and its primary channel, which are used to build a neighbor table (NT). According to one embodiment, each record of the NT may include two columns: the neighbor's address and its current channel. Having this information, nodes are enabled to beacon on the primary channels of the neighbors more frequently enabling faster propagation of aggregated information in the network. Moreover, all nodes in the network periodically may sample the environment according to the channel assessment process described earlier and build local view vectors.

The content of the beacons at any point in time depends on the current phase of the algorithm. MVS supports two phases that periodically supersede each other: a collection phase and a transmission phase. The collection phase is used to collect information by the root node about interference of the other nodes and to identify a new global channel for data transmissions. During the transmission phase, the nodes use the identified global channel to exchange data.

In diagram 900, the format of MVS beacons in the collection phase (1010) and in the transmission phase (1030) are provided. Collective beacon (1010) includes MAC header 1012, sequence number 1014, primary channel number 1016, parent identifier 1018 providing the size of the MAC address, aggregated values 1020 of GVVs, number of aggregations since last reset 1022, and MAC tail 1024. Transmission beacon 1030 includes MAC header 1032, sequence number 1034, primary channel number 1036, global channel number 1038, and MAC tail 1042.

Figure 11:
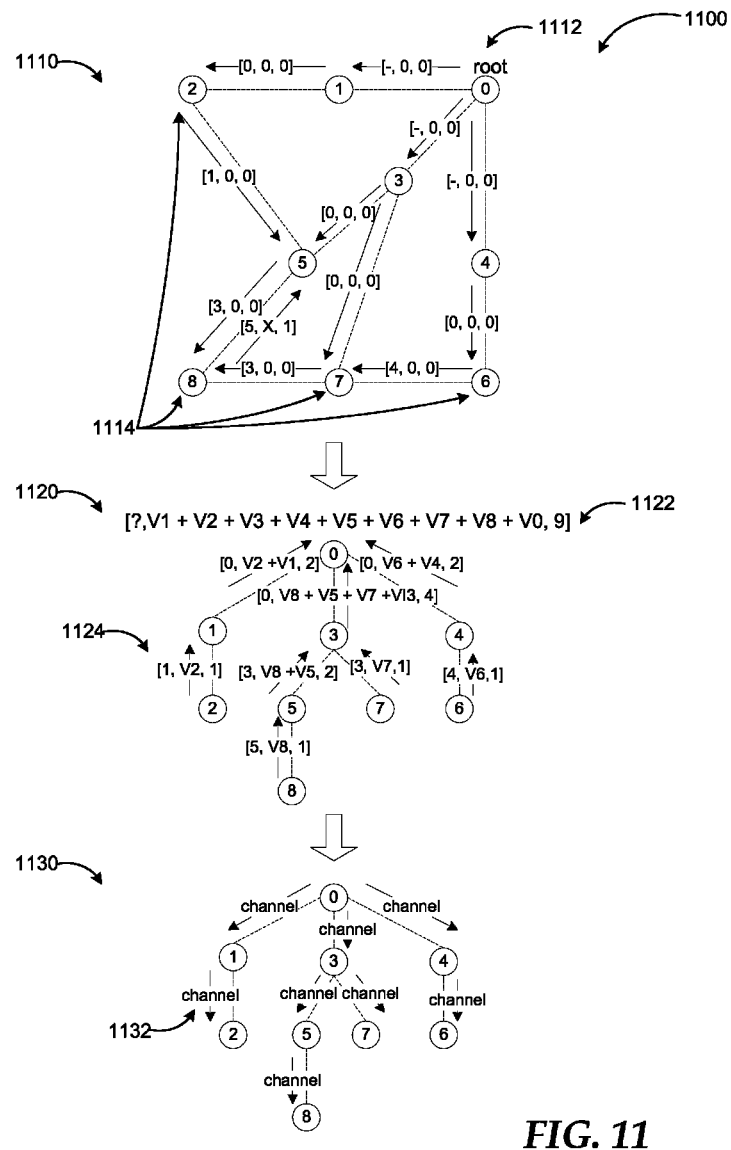
FIG. 11 is a diagram illustrating an example MVS aggregation scheme.

FIG. 11 is a diagram illustrating an example MVS aggregation scheme. As shown in diagram 1100, a new collection phase is initiated (1110) by the root element 1112. Root element 1112 issues a collection beacon with an incremented sequence counter. The format of collection beacons is as shown in FIG. 10. The collection beacons contain source address and the primary channel of the node to update NTs of its neighbors. According to some embodiments, it may also have a phase counter to be incremented by the root node each time a new phase starts. The beacon supports three fields for data collecting: a parent, an aggregated value and a count (a number of aggregations). The root node does not have a parent. For all the other nodes, parent-child relationships may be defined as follows: if node X (1114) receives a beacon with a greater sequence number from node Y, node Y becomes a parent of node X (1114). Node X (1114) updates the sequence number and the parent in its beacons, so that node Y can understand that it became a parent of node X (1114). All received beacons with less sequence numbers may be ignored. This way a spanning tree of the network is built with minimal delay.

While information in the beacons is propagated down the tree, the aggregated value and the number of aggregations equal zero. The aggregated information is updated by each node only once for the current sequence number (for the collection phase). The nodes may set the aggregated value and the count in the two following situations: if none of a node's neighbors is its child or it has received the aggregated information from all of its children. If node N has M children, with aggregated values $AV_i$ and counters $C_i$ respectively (where i is in the range from 1 to M), the beacon information of node N may be updated as follows:

$$AV_N = \Sigma_{i=1\ldots M} AV_i + V, \text{ and} \qquad [11]$$

$$C_N = \Sigma_{i=1\ldots M} C_i + 1, \qquad [12]$$

where M is the number of children and $AV_i$ and $C_i$ are aggregated value and counter received from child i, V is local interference on node N.

Thus, once the tree has been build, the nodes start updating the aggregated values and counters and propagate this information 1124 up the tree (1120). When the root node receives the aggregated information 1122 from all its children, it possesses the overall view of interference in the network. Based on this information, root node 1112 can identify the channel that is better for majority of the nodes. After identification of the global channel, the root initiates a transmission phase 1130. Root node 1112 increases the sequence counter and issues transmission beacons 1132. The format of the transmission beacon is as shown in FIG. 10. It contains a global channel for the current transmission phase. Each node receiving a transmission beacon with the greater sequence number switches to the transmission phase and changes its operation channel to the new global channel. With beacons the new global channel is delivered to all nodes in the network. If the current operational channel of the node becomes too busy, the node is allowed to switch to more silent one. In the latter scenario, a node may not be able to exchange data for a while but still can participate in the channel elections.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 12:
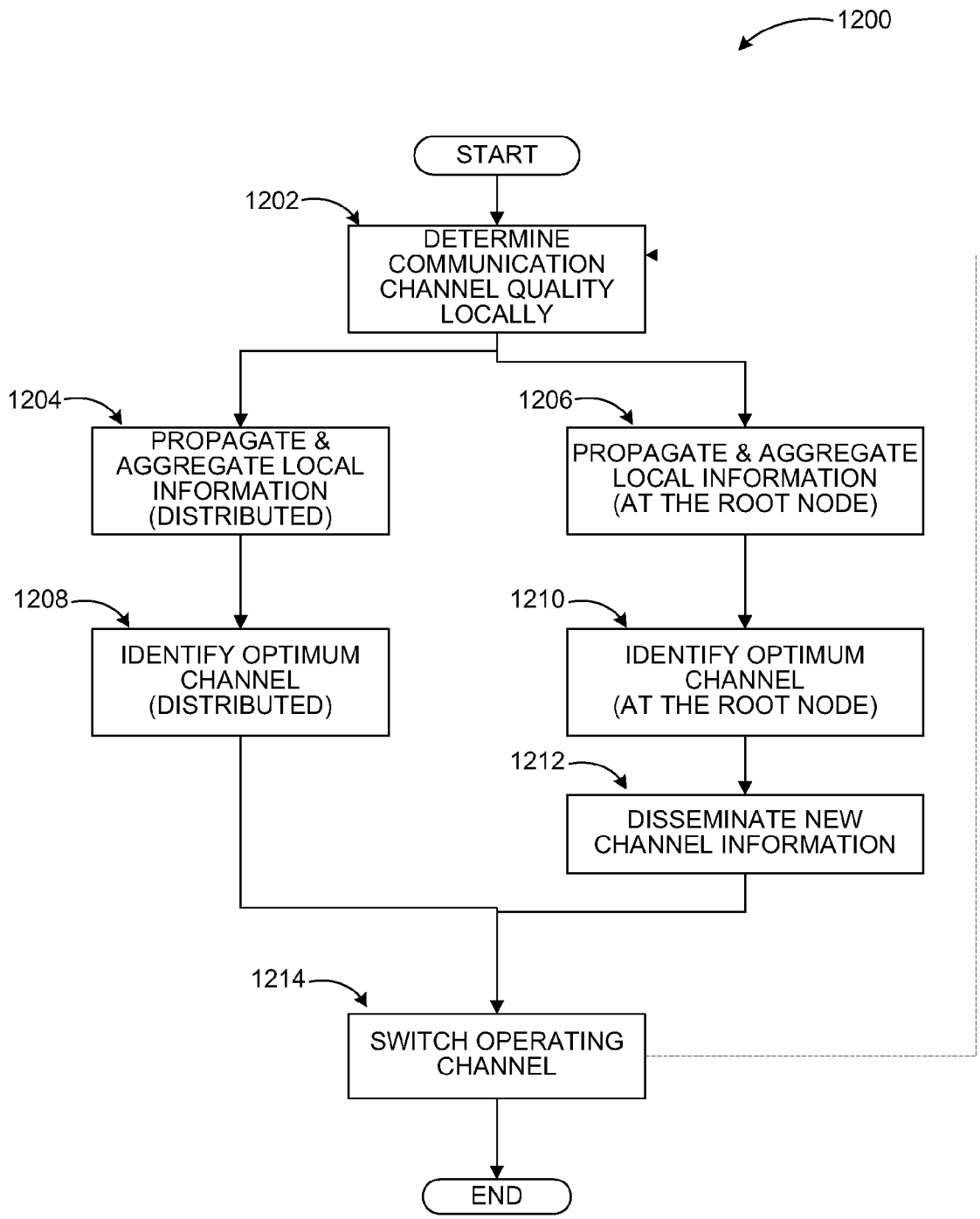
FIG. 12 illustrates a high level logic flow diagram for an operation of an example WSN according to embodiments.

FIG. 12 illustrates a high level logic flow diagram 1200 for an operation of an example WSN according to embodiments. Process 1200 may be implemented in a WSN such those described in FIG. 1.

Implementing cognitive channel adaptation in WSNs according to embodiments may include two main operation phases: channel assessment and decision on channel selection, the former being done locally by each node and the latter being done in a distributed manner or centrally. Channel selection or adaptation may employ Veto Voting or Majority Voting Schemes (VVS, MVS). VVS may be more suitable in networks where all nodes are critical and any physical partition is strongly undesirable. The algorithm finds the channel where maximum interference for any node is less than maximum interference on the other channels. If two channels have the same level of maximal interference, the channel with a less number is chosen. In this scheme, the local environment is sampled and beacons used to aggregate and propagate the collected information throughout the network. The approach is fully distributed and does not require any central entity. MVS may be more suitable for networks that can tolerate partitions or failure of a portion of the nodes. A channel that provides the best performance not for all but only for the majority of the nodes is identified and disseminated to the other nodes. Interference data is aggregated based on a spanning tree of the network. Having aggregated channel quality information, the tree root is enabled to identify the best channel and propagate it down the tree to the other nodes.

Process 1200 begins with operation 1202, where communication channel quality is determined locally by each node. As discussed previously, this may be performed by scanning for energy levels in each available channel. The operation may be optimized by taking into account expected interference sources, employing statistical algorithms in scanning subsets of available channels, and similar methods. Processing advances from operation 1202 to operations 1204 or 1206 depending on which channel selection approach is used.

Operation 1204 represents VVS approach, while operation 1206 represents the MVS approach.

At operation 1204, the sampled local channel quality information is propagated and aggregated through the network using beacons and a distributed decision made based on finding a channel where maximum interference for any node is less than maximum interference on the other channels at subsequent operation 1208. Following operation 1208, all nodes switch their operating channel to the new channel decided by the network at operation 1214.

At alternative operation 1206 employing MVS, the sampled local channel quality information is propagated and aggregated through the network using beacons based on a spanning tree of the network with an elected root sensor node at the base of the tree structure. At operation 1210 following operation 1206, an optimum channel providing best performance for a majority of the nodes and not all is identified at the elected root node and the information disseminated to the other nodes using beacons at operation 1212.

Following operation 1214, the nodes of the WSN, having received new channel information (from the root node if the MVS alternative is used), switch to the new channel with less interference for all or a majority of the nodes. Communication among the nodes continues until another cycle of channel quality assessment and new channel selection is performed.

The operations included in process 1200 are for illustration purposes. Cognitive channel adaptation in a wireless sensor network may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A system of wireless transceivers employing cognitive channel adaptation, the system comprising:
    a plurality of wireless transceivers communicating over a common wireless communication channel, each of the wireless transceivers being capable of dynamically switching from a first common communication channel to a second common communication channel in response to a decision reached by at least one of the wireless transceivers based on a determination of a quality of communication environment by at least a portion of the plurality of wireless transceivers, the wireless transceivers configured to:
        estimate an amount of communication taking place on the first common channel by detecting a level of energy on the first common channel, receiving power emission information of one or more neighboring wireless transceivers, determining whether received packets belong to a network of the wireless transceivers, discarding samples of high energy belonging to the network of the wireless transceivers, using remaining samples to calculate channel quality by applying a predefined metric comprising one of an average of energy, a mean of energy, a cardinality of different energy values, and a threshold function, and determining the second common communication channel according to one of a Veto Voting Scheme (VVS) and a Majority Voting Scheme (MVS); and
        reach the decision to switch to the second common communication channel based on one of: determining that a maximum interference for the wireless transceivers on the second common communication channel is less than a maximum interference on other available communication channels and determining that the second common communication channel provides a better quality of communication environment for at least a majority of the wireless transceivers relative to the other available communication channels.

2. The system of claim 1, wherein the wireless transceivers are wireless sensor nodes of a Wireless Sensor Network (WSN).

3. The system of claim 2, wherein the determination of the quality of the communication environment is based on a sampling measurement of energy levels in available communication channels by each wireless sensor node.

4. The system of claim 3, wherein the sampling measurement includes measuring energy levels in a subset of the available communication channels by each wireless sensor node.

5. The system of claim 3, wherein the sampling measurement includes measuring energy levels in distinct subsets of the available communication channels by neighboring wireless sensor nodes such that all available communication channels are measured by a cluster of wireless sensor nodes.

6. The system of claim 3, wherein the sampling measurement is arranged to take into consideration at least one from a set of: a frequency, a transmission bandwidth, and a modulation type of an expected interference source.

7. The system of claim 3, wherein the sampling measurement is performed by the same wireless module on the wireless sensor node that is used for communication with other wireless sensor nodes.

8. The system of claim 2, wherein the decision to switch to the second common communication channel is reached by all wireless sensor nodes based on determining that a maximum interference for any wireless sensor node on the second common communication channel is less than a maximum interference on other common communication channels.

9. The system of claim 2, wherein the decision to switch to the second common communication channel is reached by a pre-designated root wireless sensor node based on determining that the second common communication channel provides best performance environment for a majority of the wireless sensor nodes than other common communication channels, and wherein the decision is propagated from the root wireless sensor node to the other wireless sensor nodes employing beacons.

10. The system of claim 9, wherein a convergence time for switching to the second common communication channel is reduced based on dynamically adjusting a transmission frequency of the beacons.

11. The system of claim 9, wherein the pre-designated root wireless sensor node is elected by one of the following: an administrator and the wireless sensor nodes of the WSN.

12. The system of claim 1, wherein the common communication channel is based on at least one from the following: a frequency of a wireless signal, a phase of a wireless signal, and a modulation type of a wireless signal.

13. A wireless sensor node configured to communicate over a common communication channel with other wireless sensor nodes within a WSN employing cognitive channel adaptation, the wireless sensor node comprising:

a sensor module;
a power supply module;
a transceiver module;
a memory; and
a processor coupled to the sensor module, the transceiver module, the power supply module, and the memory, the processor configured to execute one or more program modules which when executed perform actions including:
  while using a first communication channel, determining a quality of communication environment by sampling energy levels in available communication channels;
  electing a root wireless sensor node according to a predefined election procedure to gather interference information from other wireless sensor nodes;
  determining that a maximum interference for the wireless sensor nodes on a new common communication channel is less than a maximum interference on the other available communication channels by estimating an amount of communication taking place on the new common channel by:
    detecting a level of energy on the new common channel,
    receiving power emission information of one or more neighboring wireless sensor nodes, and
    determining whether received packets belong to a network of the wireless sensor nodes based on preambles of the received packets;
  discarding samples of high energy belonging to the network of the wireless sensor nodes;
  using remaining samples to calculate channel quality by applying a predefined metric comprising one of an average of energy, a mean of energy, a cardinality of different energy values, and a, threshold function;
  determining the new common communication channel according to one of a Veto Voting Scheme (VVS) and a Majority Voting Scheme (MVS);
  determining that the new common communication channel provides a better quality of communication environment for at least a majority of the wireless sensor nodes;
  transmitting information associated with the quality of communication environment to the other wireless sensor nodes using a beacon;
  receiving decision information regarding switching to the new common communication channel based on the determinations; and
  switching to the new common communication channel.

14. The wireless sensor node of claim 13, wherein the actions further include:
  optimizing the determination of the quality of communication environment by performing at least one from the following:
  sampling the energy levels only in a subset of available communication channels, wherein distinct subsets of the available communication channels are assigned to neighboring wireless sensor nodes such that all available communication channels are measured by a cluster of wireless sensor nodes; and
  sampling the energy levels only in a subset of available communication channels by taking into consideration an expected interference pattern based on at least one from a set of: a transmission type of an expected interference source, a time of day, a location of each wireless sensor, and a usage pattern for the expected interference source; and
  transmitting the sampled energy levels for each measured communication channel as a value on a predefined scale within the beacon along with a corresponding communication channel number.

15. The wireless sensor of claim 13, wherein the decision regarding switching to the new common communication channel is reached by all wireless sensor nodes of the WSN and wherein a common communication channel with a smaller channel number is selected if two or more common communication channels include about same interference levels.

16. A method for employing cognitive channel adaptation in a WSN, the method comprising:
  detecting energy levels in at least a portion of available common communication channels by each wireless sensor node of the WSN;
  transmitting information associated with the detected energy levels to other wireless sensor nodes, wherein a frequency of transmission is dynamically adjustable;
  electing a root wireless sensor node according to a predefined election procedure for gathering interference information from the other wireless sensor nodes;
  reaching a decision for selecting a new common communication channel based on the detected energy levels by each of the wireless sensor nodes in the available common communication channels through:
    estimating an amount of communication taking place on a channel by detecting a level of energy on the channel,
    receiving power emission information of one or more neighboring wireless sensor nodes,
    determining whether received packets belong to a network of the wireless sensor nodes based on preambles of the received packets,
    discarding samples of high energy belonging to the network of wireless sensor nodes,
    using remaining samples to using remaining samples to calculate channel quality by applying a predefined metric comprising one of an average of energy, a mean of energy, a cardinality of different energy values, and a threshold function, and
    determining the new common communication channels according to one of a Veto Voting Scheme (VVS) and a Majority Voting Scheme (MVS);
    late channel quality by applying a predefined metric comprising one of an average of energy, a mean of energy, a cardinality of different energy values, and a threshold function, and
    determining the new common communication channels according to one of a Veto Voting Scheme (VVS) and a Majority Voting Scheme (MVS);
  disseminating the decision to all wireless sensor nodes through beacons transmitted by each wireless sensor node of the WSN; and
  switching all wireless sensor nodes to the new common communication channel.

17. The method of claim 16, wherein the detected energy level information is propagated by each wireless sensor node in a Local View Vector (LVV) and if the VVS is employed, all wireless sensor nodes converge to a Global View Vector (GVV) representing a quality of communication environment for the whole WSN.

18. The method of claim 16, wherein the detected energy level information is propagated by each wireless sensor node in a LVV aggregated at the elected root wireless sensor node and if the MVS is employed, the decision is reached by the elected root wireless sensor node the whole WSN based on the collected LVVs.

19. The method of claim 16, wherein each wireless sensor node is configured to use a predefined primary channel for receiving such that the wireless sensor node is tuned to the predefined primary channel in idle and receiving states, and wherein the primary channel of a wireless sensor node is switchable based on at least one of the following: local interference and an agreement with other wireless sensor nodes.

* * * * *